US009073349B2

(12) United States Patent
Armbruster et al.

(10) Patent No.: US 9,073,349 B2
(45) Date of Patent: *Jul. 7, 2015

(54) MARKING APPARATUS

(75) Inventors: Kevin L. Armbruster, Chicopee, MA (US); Brad D. Gilmartin, Gardner, MA (US); Peter J. Kueckendahl, Bad Oleslo (DE); Bernard J. Richard, Dudley, MA (US); Daniel J. Ryan, Sycamore, IL (US)

(73) Assignee: ALLTEC ANGEWANDTE LASERLICHT TECHNOLOGIE GMBH, Selmsdorf (DE)

( * ) Notice: Subject to any disclaimer, the term of this patent is extended or adjusted under 35 U.S.C. 154(b) by 0 days.

This patent is subject to a terminal disclaimer.

(21) Appl. No.: 14/342,483

(22) PCT Filed: Jul. 19, 2012

(86) PCT No.: PCT/EP2012/003064
§ 371 (c)(1),
(2), (4) Date: Mar. 3, 2014

(87) PCT Pub. No.: WO2013/034209
PCT Pub. Date: Mar. 14, 2013

(65) Prior Publication Data
US 2014/0247316 A1 Sep. 4, 2014

(30) Foreign Application Priority Data

Sep. 5, 2011 (EP) ..................................... 11007180

(51) Int. Cl.
*B41J 2/435* (2006.01)
*B23K 26/00* (2014.01)
(Continued)

(52) U.S. Cl.
CPC ............ *B41J 2/455* (2013.01); *B23K 26/0084* (2013.01); *B23K 26/0604* (2013.01);
(Continued)

(58) Field of Classification Search
CPC . B41J 23/00; B41J 23/32–23/36; G02B 5/08; G02B 5/136; G02B 17/00; G02B 17/002; G02B 17/008; G02B 26/08
USPC ................. 347/229–231, 234, 235, 241–243, 347/248–250, 256–258, 224, 225; 359/223.1, 224.1, 850, 904; 219/121.6, 219/121.68, 121.74–121.8
See application file for complete search history.

(56) References Cited

U.S. PATENT DOCUMENTS

| 3,705,999 A | 12/1972 | Hermann et al. |
| 3,919,663 A | 11/1975 | Caruolo et al. |

(Continued)

FOREIGN PATENT DOCUMENTS

| DE | 4029187 A1 | 3/1992 |
| DE | 4212390 A1 | 10/1993 |

(Continued)

OTHER PUBLICATIONS

International Application No. PCT/EP2012/003073, Preliminary Report on Patentability, Sep. 26, 2013, 14 pages.

(Continued)

*Primary Examiner* — Hai C Pham
(74) *Attorney, Agent, or Firm* — Hoffman Warnick LLC

(57) ABSTRACT

The invention relates to a marking apparatus (100) for marking an object with laser light, comprising a plurality of lasers (10) and a control unit for individually activating each of the lasers to emit a laser beam according to a sign to be marked. A set of deflection means (30) for rearranging the laser beams into a two-dimensional array of laser beams is provided, the set of deflection means (30) comprises at least one deflection means (33) per laser beam, in particular at least one mapping mirror (33) or one optical waveguide per laser beam.

14 Claims, 3 Drawing Sheets

(51) Int. Cl.

| | | |
|---|---|---|
| *B41J 2/455* | (2006.01) | |
| *B23K 26/06* | (2014.01) | |
| *B23K 26/08* | (2014.01) | |
| *B23K 26/36* | (2014.01) | |
| *H01S 3/07* | (2006.01) | |
| *H01S 3/03* | (2006.01) | |
| H01S 3/08 | (2006.01) | |
| H01S 3/083 | (2006.01) | |
| H01S 3/223 | (2006.01) | |
| H01S 3/23 | (2006.01) | |
| H01S 3/00 | (2006.01) | |

(52) U.S. Cl.
CPC ........ *B23K 26/0608* (2013.01); *B23K 26/0643* (2013.01); *B23K 26/0648* (2013.01); *B23K 26/0807* (2013.01); *B23K 26/365* (2013.01); *H01S 3/076* (2013.01); *H01S 3/08059* (2013.01); *H01S 3/0835* (2013.01); *H01S 3/2232* (2013.01); *H01S 3/2383* (2013.01); *H01S 3/005* (2013.01); *H01S 3/03* (2013.01)

(56) References Cited

U.S. PATENT DOCUMENTS

| | | | |
|---|---|---|---|
| 4,131,782 | A | 12/1978 | Einstein et al. |
| 4,189,687 | A | 2/1980 | Wieder et al. |
| 4,376,496 | A | 3/1983 | Sedam et al. |
| 4,467,334 | A * | 8/1984 | Anzai ............................ 347/118 |
| 4,500,998 | A | 2/1985 | Kuwabara et al. |
| 4,652,722 | A * | 3/1987 | Stone et al. .............. 219/121.76 |
| 4,720,618 | A | 1/1988 | Stamer et al. |
| 4,727,235 | A | 2/1988 | Stamer et al. |
| 4,744,090 | A | 5/1988 | Freiberg |
| 4,907,240 | A | 3/1990 | Klingel |
| 4,912,718 | A | 3/1990 | Klingel |
| 4,991,149 | A | 2/1991 | Maccabee |
| 5,012,259 | A | 4/1991 | Hattori et al. |
| 5,109,149 | A * | 4/1992 | Leung ....................... 219/121.69 |
| 5,115,446 | A | 5/1992 | Von Borstel et al. |
| 5,229,573 | A | 7/1993 | Stone et al. |
| 5,229,574 | A * | 7/1993 | Stone ....................... 219/121.68 |
| 5,268,921 | A | 12/1993 | McLellan |
| 5,337,325 | A * | 8/1994 | Hwang ........................... 372/36 |
| 5,339,737 | A | 8/1994 | Lewis et al. |
| 5,431,199 | A | 7/1995 | Benjay et al. |
| 5,572,538 | A | 11/1996 | Saitoh et al. |
| 5,592,504 | A | 1/1997 | Cameron |
| 5,646,907 | A | 7/1997 | Maccabee |
| 5,706,305 | A | 1/1998 | Yamane et al. |
| 5,729,568 | A | 3/1998 | Opower et al. |
| 5,815,523 | A | 9/1998 | Morris |
| 5,982,803 | A | 11/1999 | Sukhman et al. |
| 6,050,486 | A | 4/2000 | French et al. |
| 6,057,871 | A | 5/2000 | Peterson |
| 6,069,843 | A | 5/2000 | DiMarzio et al. |
| 6,122,562 | A | 9/2000 | Kinney et al. |
| 6,141,030 | A | 10/2000 | Fujita et al. |
| 6,229,940 | B1 | 5/2001 | Rice et al. |
| 6,263,007 | B1 | 7/2001 | Tang |
| 6,303,930 | B1 | 10/2001 | Hagiwara |
| 6,370,884 | B1 | 4/2002 | Kelada |
| 6,421,159 | B1 | 7/2002 | Sutter et al. |
| 6,539,045 | B1 | 3/2003 | Von Borstel et al. |
| 6,621,838 | B2 | 9/2003 | Naito et al. |
| 6,856,509 | B2 | 2/2005 | Lin |
| 6,915,654 | B2 | 7/2005 | Johnson |
| 7,346,427 | B2 | 3/2008 | Hillam et al. |
| 7,496,831 | B2 | 2/2009 | Dutta et al. |
| 7,521,651 | B2 | 4/2009 | Gross et al. |
| 7,565,705 | B2 | 7/2009 | Elkins et al. |
| 8,263,898 | B2 | 9/2012 | Alber |
| 2001/0030983 | A1 | 10/2001 | Yuri et al. |
| 2003/0010420 | A1 | 1/2003 | Morrow |
| 2003/0123040 | A1 | 7/2003 | Almogy |
| 2003/0147443 | A1 | 8/2003 | Backus |
| 2005/0056626 | A1 | 3/2005 | Gross et al. |
| 2005/0094697 | A1 | 5/2005 | Armier et al. |
| 2006/0161381 | A1 | 7/2006 | Jetter |
| 2007/0138151 | A1 | 6/2007 | Tanaka et al. |
| 2008/0094636 | A1 | 4/2008 | Jin et al. |
| 2009/0010285 | A1 | 1/2009 | Dubois et al. |
| 2009/0245318 | A1 | 10/2009 | Clifford, Jr. |
| 2009/0323753 | A1 | 12/2009 | Gmeiner et al. |
| 2011/0102537 | A1 | 5/2011 | Griffin et al. |
| 2014/0224778 | A1* | 8/2014 | Armbruster et al. ..... 219/121.68 |

FOREIGN PATENT DOCUMENTS

| | | | |
|---|---|---|---|
| DE | 10125447 | A1 | 1/2002 |
| EP | 0157546 | A2 | 10/1985 |
| EP | 0427229 | A3 | 5/1991 |
| EP | 1184946 | A1 | 3/2002 |
| GB | 1495477 | A | 12/1977 |
| GB | 2211019 | A | 6/1989 |
| GB | 2249843 | A | 5/1992 |
| GB | 2304641 | A | 3/1997 |
| JP | 63094695 | A | 4/1988 |
| JP | 5129678 | A | 5/1993 |
| JP | 2001276986 | A | 10/2001 |
| JP | 2007032869 | A | 2/2007 |
| JP | 2007212118 | A | 8/2007 |
| JP | 2011156574 | A | 8/2011 |
| WO | 0046891 | A1 | 8/2000 |
| WO | 0107865 | A2 | 2/2001 |
| WO | 0243197 | A2 | 5/2002 |

OTHER PUBLICATIONS

International Application No. PCT/EP2012/003072, Preliminary Report on Patentability, Mar. 12, 2014, 7 pages.
International Application No. PCT/EP2012/003071, Preliminary Report on Patentability, Mar. 12, 2014, 5 pages.
International Application No. PCT/EP2012/003070, Preliminary Report on Patentability, Mar. 12, 2014, 7 pages.
International Application No. PCT/EP2012/003069, Preliminary Report on Patentability, Nov. 27, 2013, 32 pages.
International Application No. PCT/EP2012/003068, Preliminary Report on Patentability, Mar. 12, 2014, 5 pages.
International Application No. PCT/EP2012/003067, Preliminary Report on Patentability, Nov. 28, 2013, 19 pages.
International Application No. PCT/EP2012/003066, Preliminary Report on Patentability, Nov. 28, 2013, 19 pages.
International Application No. PCT/EP2012/003065, Preliminary Report on Patentability, Nov. 28, 2013, 21 pages.
International Application No. PCT/EP2012/003064, Preliminary Report on Patentability, Nov. 15, 2013, 18 pages.
International Application No. PCT/EP2012/003063, Preliminary Report on Patentability, Mar. 12, 2014, 5 pages.
International Application No. PCT/EP2012/003062, Preliminary Report on Patentability, Mar. 12, 2014, 6 pages.
International Application No. PCT/EP2012/003061, Preliminary Report on Patentability, Mar. 12, 2014, 6 pages.
International Application No. PCT/EP2012/003073, Search Report and Written Opinion, Dec. 18, 2012, 8 pages.
International Application No. PCT/EP2012/003072, Search Report and Written Opinion, Oct. 8, 2012, 11 pages.
International Application No. PCT/EP2012/003071, Search Report and Written Opinion, Nov. 15, 2012, 9 pages.
International Application No. PCT/EP2012/003070, Search Report and Written Opinion, Oct. 8, 2012, 11 pages.
International Application No. PCT/EP2012/003069, Search Report and Written Opinion, Sep. 27, 2012, 8 pages.
International Application No. PCT/EP2012/003068, Search Report and Written Opinion, Nov. 15, 2012, 8 pages.
International Application No. PCT/EP2012/003067, Search Report and Written Opinion, Nov. 16, 2012, 7 pages.
International Application No. PCT/EP2012/003066, Search Report and Written Opinion, Nov. 15, 2012, 7 pages.

(56) References Cited

OTHER PUBLICATIONS

International Application No. PCT/EP2012/003065, Search Report and Written Opinion, Nov. 16, 2012, 7 pages.
International Application No. PCT/EP2012/003064, Search Report and Written Opinion, Nov. 16, 2012, 7 pages.
International Application No. PCT/EP2012/003063, Search Report and Written Opinion, Nov. 15, 2012, 9 pages.
International Application No. PCT/EP2012/003062, Search Report and Written Opinion, Nov. 15, 2012, 10 pages.
International Application No. PCT/EP2012/003061, Search Report and Written Opinion, Sep. 10, 2012, 9 pages.
U.S. Appl. No. 14/342,510, Office Action dated Aug. 1, 2014.
U.S. Appl. No. 14/342,508, Office Action dated Aug. 14, 2014.
U.S. Appl. No. 14/342,503, Office Action dated Aug. 21, 2014.
U.S. Appl. No. 14/342,487, Office Action dated Aug. 14, 2014.
U.S. Appl. No. 14/342,483, Office Action dated Oct. 2, 2014.
U.S. Appl. No. 14/342,503, Final Office Action dated Dec. 18, 2014, 22 pages.
U.S. Appl. No. 14/342,493, Office Action dated Nov. 19, 2014.
U.S. Appl. No. 14/342,508, Final Office Action dated Dec. 10, 2014, 23 pages.
Final Office Action for U.S. Appl. No. 14/342,487, dated Feb. 2, 2015, 31 pages.
Notice of Allowance and Fee(s) Due for U.S. Appl. No. 14/342,510, dated Feb. 20, 2015, 20 pages.
Notice of Allowance and Fee(s) Due for U.S. Appl. No. 14/342,503, dated Mar. 17, 2015, 11 pages.
Notice of Allowance and Fee(s) Due for U.S. Appl. No. 14/342,508, dated Apr. 1, 2015, 15 pages.
Final Office Action for U.S. Appl. No. 14/342,493, dated Apr. 21, 2015, 25 pages.

\* cited by examiner

MARKING APPARATUS

FIELD OF THE INVENTION

The present invention relates to a marking apparatus for marking an object with laser light.

Generally, marking apparatuses are known which deploy a single gas laser, e.g. a $CO_2$ laser. Such a laser emits a light beam which is delivered to the object to be marked. The object is moved relative to the marking apparatus on a conveyor belt. Typically, a scanning device is provided for directing the light beam on the object according to a sign to be marked. As a high throughput of objects is generally desired, the speed of the object on the conveyor belt relative to the marking apparatus should be as high as possible. However, the speed cannot be arbitrarily increased since the scanning device requires sufficient time to write the mark on the object as it passes. Hence, the speed of such marking devices is limited by the speed of the scanning devices.

RELATED ART

The throughput can be further increased with generic marking apparatuses that comprise a plurality of lasers, in particular gas lasers, and a control unit for individually activating each of the lasers to emit a laser beam according to a sign to be marked.

For achieving ever greater marking speeds, marking apparatuses with a larger numbers of lasers are demanded. However, the number of lasers employed is hitherto strongly restricted as the size of the individual lasers leads to unduly large apparatuses and also hampers the laser beam delivery to the object to be marked.

Subject-matter of GB 2 304 641 A is a marking apparatus with a plurality of lasers. The emitted laser beams are rearranged with a plurality of mirrors into a fixed linear array.

A laser apparatus for illuminating the lithographic printing plates is described in U.S. Pat. No. 5,339,737. A plurality of laser sources is provided and the emitted beams are guided to a writing array. From the writing array, the beams exit in a predetermined linear array.

US 2009/0323753 A1 discloses another marking apparatus with a number of lasers. The emitted beams are guided to discharge bodies which are again arranged in a one-dimensional configuration.

Subject-matter of U.S. Pat. No. 4,720,618 is a laser marking system wherein a plurality of emitted laser beams are directed in a one-dimensional array onto an article to be marked.

SUMMARY OF THE INVENTION

It is an object of the invention to provide a marking apparatus that allows for a particularly flexible delivery of the light beams of a plurality of lasers.

This objective is solved with a marking apparatus.

Preferred embodiments are given in the following description, in particular in connection with the attached figures.

According to embodiments of the invention, the marking apparatus of the above mentioned kind is characterized in that a set of deflection means for rearranging the laser beams into a two-dimensional array of laser beams is provided, and the set of deflection means comprises at least one deflection means per laser beam, in particular at least one mapping mirror or one optical waveguide per laser beam.

A length of the two-dimensional array of laser beams may then be shorter than a length of an array formed by the laser beams prior to impinging on the set of deflection means. The length may be understood as the distance between the two laser beams having the greatest distance to one another. In the case of the two-dimensional array, this distance can be a diagonal of the array.

It can be regarded as an idea of the invention to provide for at least one deflection means per light beam for individually deflecting each beam. That means each light beam is directed to its respective deflection means. The deflection means are adjustable independent from one another such that basically any desired configuration can be set.

The two-dimensional array may be understood as any arrangement other than laser beams being arranged in a row. In some embodiments, the two-dimensional array comprises several rows, the laser beams of each row having the same separation. Other two-dimensional arrays may be a rectangle such as at least three rows wherein each row consists of at least three laser beams.

As opposed to prisms, the set of deflections means causes less distortion, particularly when mirrors are employed as deflection means.

In the context of the invention, the activation of each of the lasers to emit a laser beam may be understood as any process that controls whether a light beam impinges on the object to be marked. Hence, the activation may also be carried out via a beam shutter. That is, a laser stays activated and a beam shutter controls the passing or blocking of the laser beam of the laser.

Generally, the lasers may be any kind of lasers. The invention may be advantageous if lasers in which space is critical are deployed. That is, if the laser power strongly depends on the size of the laser. Another advantage of the invention may become readily apparent if the laser dimensions prohibit generating laser beams that are very close to each other. The invention also allows for a rearrangement of the laser beams resulting in a small distance between the laser beams and thus a high marking resolution.

Examples of such lasers are gas lasers, chemical lasers, fibre lasers, dye lasers, and solid-state lasers. Possibly, also semiconductor lasers or metal-vapor lasers may be employed. If gas lasers are used, these may be of any generally known kind, such as HeNe lasers, CO lasers, Argon lasers, nitrogen lasers, or excimer lasers. Preferably, the gas lasers are $CO_2$ lasers. These may be operated as c.w. or pulsed, e.g. by Q-switching or mode-locking.

The sign that is to be marked may be understood as any mark, e.g. a character, a picture or single pixels of a graphic. The sign may consist of a number of dots or lines. That is, the lasers may be activated for short periods to produce dots on the object or for a settable time span to cause lines of a certain length.

In the sense of the invention, the object to be marked may be any item or product with a surface that can be affected with the light of the lasers. In particular, the object may be a packaging, e.g. for food or beverage, a fruit or a label. The material of the object may comprise plastics, paper, metals, ceramics, fabrics, composites or organic tissues.

The marking itself may be any change in the object's surface, e.g. a color change, an engraving or a cut.

In an embodiment of the inventive apparatus, each deflection means is individually adjustable in its deflection direction and/or individually shiftable for setting any desired two-dimensional array of laser beams. The deflection means may be set to a desired position during or prior to the operation of the marking device. To this purpose, each deflection means may be displaced by an electrical motor which is controlled by the control unit.

In case of the deflection means being mirrors, the adjustment may be carried out by individually tilting the mirrors, i.e., changing the deflection directions or pointing directions of the mirrors. Additionally or alternatively, the mirrors, which may also be referred to as mapping mirrors, may be displaceable, that is shiftable.

According to an embodiment of the invention, the deflection means are adjusted such that a beam separation between the laser beams is reduced. The disadvantages of large beam separations due to large dimensions of the lasers may then be mitigated. Furthermore, a high marking resolution can be achieved. In contrast to devices for reducing the beam separation in which all light beams are directed onto a common optical element, e.g., a suitable prism, the deflection means of the inventive apparatus lead to less distortion of the light beams.

A reduced beam separation also leads to the laser beams impinging more centrally on common optical elements. That can be beneficial as spherical aberration and the likes of which occur between paraxial rays, i.e. laser beams impinging on the center of a lens or mirror, and marginal rays, that is laser beams impinging far off the center of the lens or mirror. Reducing the beam separation is thus conducive to reducing spherical aberration.

It is generally possible that a two-dimensional array of laser beams is produced with a set of deflection means that consists of only one deflection means per laser beam. In this case, however, the reflected laser beams are then skew or converging. A desired 2D pattern is thus only present at one certain distance.

It may therefore be preferred that the set of deflection means comprises a first and a second set of mapping mirrors, wherein each set of mapping mirrors comprises at least one mapping mirror per laser beam. The first set of mapping mirrors then directs the laser beams onto the second set of mapping mirrors, and the second set of mapping mirrors is arranged in a two-dimensional configuration for redirecting the laser beams in the two-dimensional array. Hence, each light beam is individually directed via at least two mapping mirrors. This may allow for a particularly flexible rearrangement of the light beams. In particular, the laser beams may run in parallel to each other when reflected from the second set of mapping mirrors.

Generally, it is possible that the deflection means are manually adjustable, in particular displaceable. However it may be preferred that the control unit is adapted for shifting the deflection means and/or adjusting the deflection directions of the deflection means, in particular via gimbal mounts. For broad fields of application, each of the deflection means may be individually adjustable by the control unit. In a comparably cost-effective implementation, at least one deflection means per laser beam is adjustable by the control unit. Gimbal mounts may allow for rotations of the mounted deflection means in at least two rotational degrees of freedom or even in all directions.

The adjustment of the deflection means by the control unit allows for a variable code positioning. That means, the direction of the laser beams emanating from the apparatus can be altered to change a position of a code to be produced with the laser beams on the object. Additionally a code height can be varied.

Furthermore, a static marking is possible. In this, the object is not moved relative to the marking apparatus for the whole marking operation. The deflection means are operated to cause a scanning movement of the laser beams such that all signs to be printed are successively produced on the resting object. This embodiment may be preferred for printing 2D graphics which require a high printing resolution.

The control unit may be further adapted to provide a multiple-strike option. If the laser beams are pulsed, this means that a plurality of pulses is directed onto a common spot on the object. For that purpose, a relative movement between the object and the apparatus as well as an appropriate timing of the firing of the lasers may be deployed. Alternatively, the adjustment of the deflection means of one laser beam may be altered such that successive pulses of one laser are directed onto the common spot. A grey-scale printing is thus made possible.

The control unit may be further adapted to provide a high-power option. The adjustment of the deflection means of one or more laser beams may be altered such that the output of one or more lasers are directed onto a common spot. In this way, materials that require a higher power than a single laser can provide may still be marked. The laser beams that are directed onto the common spot may not run in parallel but converge such that they overlap at a certain distance to form the common spot.

The control unit may be further adapted to automatically adjust the deflection means to positional changes of the object, e.g. to compensate for vibrations of the object. The positional changes may be determined by a sensor such as ultrasonic or optical means or a proximity switch.

An embodiment of the inventive apparatus is characterized in that at least one scanning mirror device is provided which comprises a common mirror onto which all laser beams coming from the set of deflection means impinge, and the control unit is adapted for pivoting the scanning mirror device, in particular via a galvanometer of the scanning mirror device.

A scanning mirror device may be understood as any instrument that causes a light beam to pass sequentially a number of spatial positions. In simple cases, such devices may comprise a rotatable mirror which is rotatable around an axis normal to the plane of the incident light beam. The rotatable mirror may comprise a mirror drum, i.e., a polygon with a number or mirrors that are rotated together around a single axis.

Devices comprising a galvanometer to which a mirror is connected are generally referred to as galvanometer scanners. Such scanners convert input electric signals into an angular position of the mirror of the scanner, for example with a moving coil or a solid iron rotor. Any location to which the reflected light beam is directed may be addressed independent from the previous position of the light beam. In some embodiments, at least two galvanometer scanners are provided. When the galvanometer scanners are arranged such that each laser beam is directed from the first galvanometer scanner to the second galvanometer scanner, any two-dimensional scanning movement is possible.

The tasks of the scanning mirror device may also be executed with acousto-optical devices. In these, an acoustic wave is coupled into an acousto-optic material. The frequency of the acoustic wave governs the angle of deflection of a laser beam travelling through the acousto-optic material. By rapidly altering the frequency of the acoustic wave, a fast scanning motion of the laser beam can be achieved.

For marking the object while it is moving relative to the marking apparatus, in another embodiment the control unit is adapted to adjust the deflection means and/or the at least one scanning mirror device according to information on a movement of the object. The object can thus be chased or tracked. It is possible to speed up or slow down a relative movement between the apparatus and the conveying unit moving the object. The speed of the marking process can thus be increased.

According to still another embodiment of the invention, the first set of mapping mirrors forms a linear array; the second set of mapping mirrors forms a two-dimensional array, and each mapping mirror is tiltable.

Another embodiment of the inventive apparatus is characterized in that the control unit is adapted for controlling the deflection means to set a degree of convergence or divergence of the laser beams emanating from the deflection means, in particular from the second set of deflection means. The deflection means can thus be adjusted such that a desired pitch between the laser beams is caused at a given distance from the apparatus. The height of a character produced by the laser beams as well as the printing resolution, i.e., the distance between markings caused by neighbouring laser beams on the object, are governed by the separation of the laser beams and can thus also be varied by adjusting the degree of convergence. To this end a fast tilting of the deflection means suffices and there is no need for changing the distance between the deflection means which might be more time consuming.

According to still another embodiment of the invention, a telescopic device with at least two lenses is provided for global adjustment of the focal lengths of the laser beams. The global adjustment may be understood such that all laser beams of the lasers run through the telescopic device and are thus affected in the same way. The control unit may be adapted to set the telescopic device according to the distance of the object, in particular such that the focal lengths of the laser beams correspond to the distance to the object. Spot sizes of markings produced on the object can be held constant while the object is approaching or moving away from the apparatus. Information on the distance to the object may be supplied to the control unit either from a conveying unit that moves the object and/or by deploying generally known distance measuring means. The telescopic device may be arranged behind the deflection means, as the maximum beam separation between any two laser beams may be reduced by the deflection means. Optical elements of the telescopic device may thus be built smaller.

In a variant of the inventive apparatus, a set of beam shaping means, which may also be referred to as telescopic means, is provided for individually shaping each laser beam, in particular for setting a degree of convergence or divergence, and thus a focal length, of each laser beam. This can be carried out for each beam separately. It is thus possible to compensate for beam path differences, i.e., the lengths of the paths the individual light beams travel until they reach the object are different. This may be due to the surface profile of the object or different internal path length within the marking apparatus.

Each telescopic means may comprise at least two optical elements, in particular at least two lenses or curved mirrors, the distance between which being adjustable for setting the focal length. The telescopic means may thus be designed as refracting telescopes which use lenses, as reflecting telescopes which use mirrors, or as catadioptric telescopes which use at least one mirror and at least one lens The telescopic means can be linearly adjusted by the control unit, i.e. the position of at least one optical element of each telescopic means is changed in the direction of propagation of the respective laser beam.

The control unit may be adapted to control the telescopic means to compensate for path length differences between the laser beams, in particular path length differences due to the arrangement of the deflection means. Depending on where the deflection means are located, the beam paths of the laser beams may have different lengths, leading to different spot sizes of the laser beams on the object. With the telescopic means, a flat field correction is possible in which each laser beam has the same focal distance measured from an end side of the apparatus.

The control unit may also be adapted to adjust the telescopic means in real-time when the path lengths are changed due to an adjustment of the deflection means. Additionally or alternatively, the control unit may adapted to set the telescopic means according to any information regarding a change in the path lengths, such as a vibration or any other movement of the object, or a redirecting of the laser beams with a scanning device.

According to another embodiment of the invention, the control unit is adapted to delay the activation of each laser individually such that, in the case of an object moving relative to the marking apparatus in an object movement direction, at least two laser beams impinge on the object at the same position in the object movement direction. The timing of the activation of the lasers may be such that all laser beams impinge on the object at the same position in the object movement direction.

Furthermore, regardless of the orientation between the emanating laser beams and the object movement direction, the different laser beams may cause marking spots in a line which is perpendicular to the object movement direction. The length of the line depends on the orientation between the emanating laser beams and the object movement direction.

The lasers may be stacked such that the laser beams emitted by the lasers form an array of laser beams, in particular a linear array with parallel laser beams. Each laser may be a gas laser which comprises resonator tubes that at least partially surround an inner area, that is the resonator tubes form a closed or open ring. The emitted laser beams are directed into the inner area with beam-delivery means, in some embodiments a set of mirrors. It is generally also possible that the beam-delivery means are formed by the output coupler mirrors of the gas lasers. In this case a resonator tube end portion of each gas laser may point into the direction of the inner area. The set of deflection means may then be arranged in the inner area.

Cooling of the laser tubes is facilitated in that those resonator tubes that are arranged on opposing sides of the closed or open ring are at a maximum distance to each other, while at the same time the overall dimensions of the apparatus are not increased, as optical elements are space-savingly accommodated in the inner area.

It may be preferred that each gas laser comprises resonator tubes that at least partially surround an inner area, beam delivery means are provided for directing the laser beams emitted by the gas lasers into the inner area, and the beam delivery means are part of the telescopic means. The beam delivery means may comprise one mirror per laser beam, which mirror may form a first optical element of each telescopic means.

Alternatively, the output couplers of the gas lasers for coupling out laser beams may be part of the telescopic means. The output couplers may be partially reflecting mirrors wherein the outer surface, i.e. the surface facing away from the laser gas, of each mirror may generally have any shape. It is therefore preferred that the shape is such that each output coupler behaves like a first lens of a generally known telescope.

A variant of the invention is concerned with the case of a failed pixel, that means a laser is defective and does not emit a laser beam. For substituting the laser beam of a failed laser, the control unit may be adapted to adjust the deflection means and the telescopic means such that the laser beam of a functioning laser is deflected in the direction of the failed laser beam. The telescopic means are thus controlled to adjust for the path length difference between the failed laser beam and the laser beam used for substituting the former.

Another embodiment of the invention is characterized in that each deflection means is an optical waveguide, each optical waveguide comprises a first end portion for receiving one of the laser beams and a second end portion for emitting the respective laser beam, and the second end portions of the optical waveguides are arranged in a two-dimensional configuration. The first end portions of the optical waveguides are arranged corresponding to the array of the incident laser beams, e.g. in a linear array.

The optical waveguides may be any flexible waveguides that guide light with the wavelengths emitted by the lasers, in particular infrared light with a wavelength of about 10 µm. Examples of optical waveguides are optical fibers or hollow tubes with a reflective inner surface.

Each optical waveguide may be equipped with input coupling optics for directing the impinging laser beam into a core of the optical waveguide in a proper angle. The optical waveguides may also be equipped with output coupling optics comprising in particular at least two lenses for collecting the laser radiation leaving the waveguide. The output coupling optics may determine the laser beam size, focal length and depth of focus. In particular, the output coupling optics may be formed as telescopic means. The optical waveguides may have the same length. This leads to the spot size and quality of markings caused on the object being more consistent.

The invention further relates to a marking system that comprises a marking apparatus as described above, and which further comprises pivoting means for tilting the marking apparatus relative to an object movement direction.

As will be explained subsequently, by tilting the marking apparatus, it is possible to alter the printing resolution, i.e. the distance between marking spots on the object in a direction perpendicular to an object movement direction. This is governed by the beam separation in the direction perpendicular to an object movement direction. A beam separation in the object movement direction is not detrimental to the printing resolution, as the activation of the lasers can be delayed until the object has moved by as much as the beam separation in the object movement direction.

It is then possible to change the beam separation in the direction perpendicular to an object movement direction by tilting the marking apparatus and thus the two-dimensional arrangement of laser beams. The control unit may be adapted to tilt the marking apparatus with the pivoting means according to a desired printing resolution.

Together with properly timing the firing of the lasers, the tilt angle can be set such that the marking spots form a continuous line or separated marking spots. Overlapping marking spots may be produced to cause different intensities of marking spots, e.g. for grey-scale printing. Furthermore, a complete overlap of the marking spots may be achieved by adequately choosing the tilt angle and the delay between the firing, i.e., activation of the lasers is chosen.

BRIEF DESCRIPTION OF THE DRAWINGS

A better understanding of the invention and various other features and advantages of the present invention will become readily apparent by the following description in connection with the drawings, which are shown by way of example only, and not limitation, wherein like reference numerals refer to substantially alike components.

DETAILED DESCRIPTION OF THE INVENTION

Figure 1:
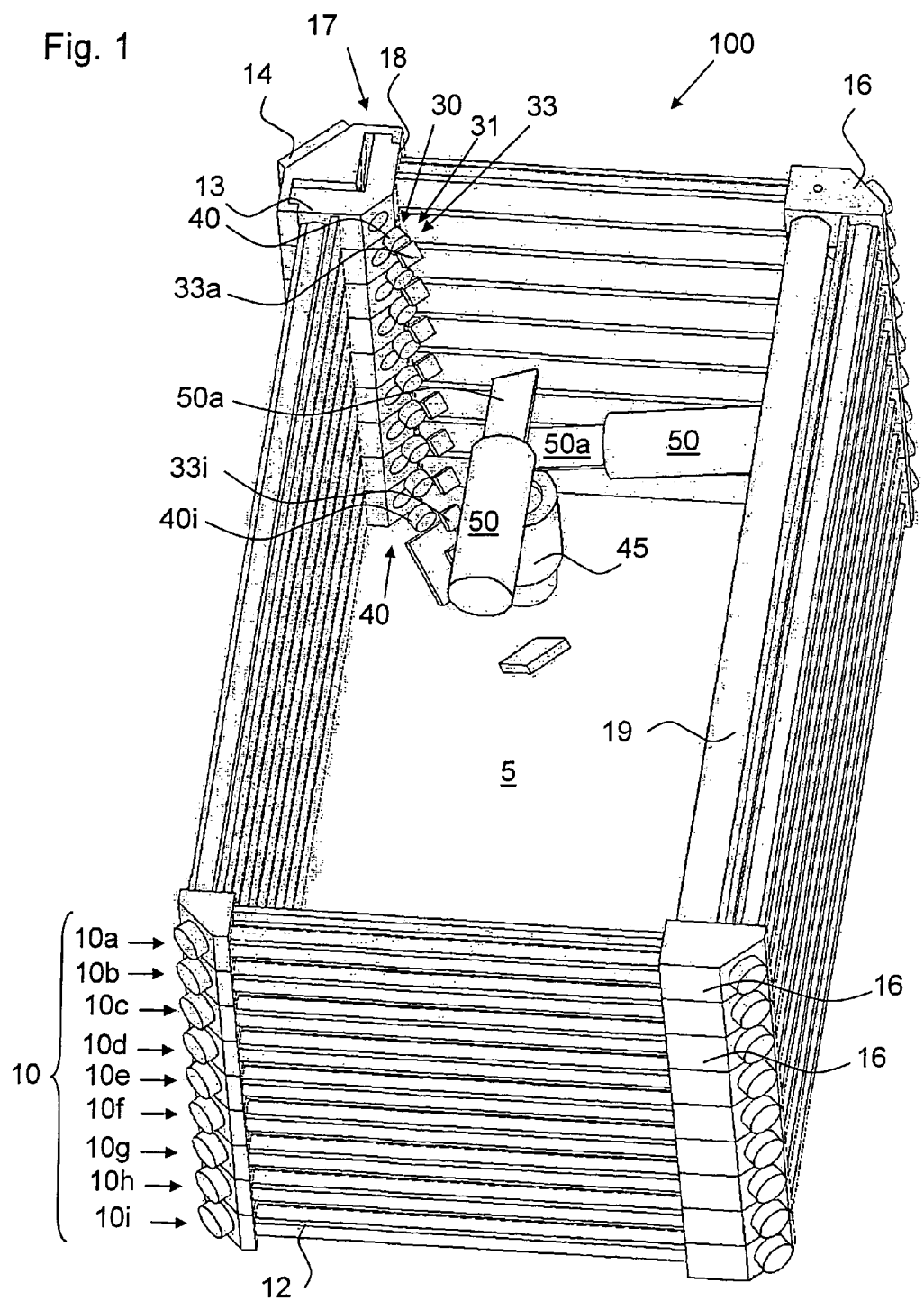
FIG. 1 shows a schematic diagram of a first embodiment of an inventive marking apparatus.

FIG. 1 shows schematically an embodiment of a marking apparatus 100 according to the invention. The marking apparatus 100 comprises a plurality of gas lasers 10, each emitting a laser beam that is used to produce a marking on an object (not depicted). For forming and directing the laser beams, the apparatus 100 further comprises optical means 30, 40, 45, 50.

In the example shown, the plurality of gas lasers 10 consists of nine gas lasers 10a-10i. In general, a large number of gas lasers 10 is desirable, e.g., at least four or six lasers. Each gas laser 10 comprises resonator tubes 12 that are in fluidic connection to each other. That means, the resonator tubes 12 of one gas laser form a common resonator volume. It is also possible that the resonator tubes 12 of different lasers 10 are in fluidic connection.

In the depicted embodiment, the gas lasers are $CO_2$ lasers and the laser gas accordingly comprises, amongst others, CO, $N_2$ and He.

The resonator tubes 12 are arranged in the shape of a ring surrounding an inner area or free central space 5 between them. The ring is formed with connecting elements 16 for connecting adjacent resonator tubes 12 belonging to the same laser. The connecting elements 16 are arranged in the corners of the stacked lasers and house mirrors for reflecting laser light from one of the adjacent tubes 12 to the other. Naturally, all mirrors are selected dependent on the laser gas used. In the present case, the mirrors comprise a material reflective in the wavelength region of a $CO_2$ laser, i.e. medium-IR radiation, primarily at 10.6 µm. For example, a copper mirror and/or a substrate with a coating for increasing reflectivity and/or preventing tarnishing in air may be provided.

In the depicted example, the resonator tubes 12 form a sealed ring in the shape of a rectangle. In general, any other shape that at least partially encloses the inner area 5 may be chosen, such as a triangular, a square or a U-pattern.

The resonator tubes 12 of each gas laser 10a-10i constitute a sealed volume. The volumes of the lasers may be separated from each other or interconnected to form a common sealed volume. In sealed lasers, it is generally desired that the laser gas composition stays constant over a long period. To this end, the gas volume is increased with an additional gas reservoir 19. The gas in the reservoir is not excited to generate laser light. Rather, the reservoir 19 is connected to the gas volumes of one or several resonator tubes 12.

The rectangular shape of the lasers 10 may be open at one corner. In the depicted embodiment this is the top left corner at which an integrated output flange 17 is provided. At this corner, the laser volume is terminated by a rear mirror 18 for reflecting laser light back inside the tubes 12. The rear mirror 18 may be connected to an end tube 12 which is supported by the integrated output flange 17, or the rear mirror 18 may be attached to the integrated output flange 17.

The other end of the laser volume is terminated at the same corner by an output coupler 13. The output coupler 13 couples out a laser beam and may again be connected to either an end tube 12 or the integrated output flange 17. The output coupler 13 may be a partially reflecting mirror 13 and may also be referred to as partially reflecting output coupler. The emitted laser beams are then directed into the inner area 5 with beam delivery means 14. In the embodiment shown, the beam delivery means 14 comprise at least one mirror 14 arranged at the integrated output flange 17. The laser beams reflected from the beam delivery means 14 enter the inner area 5 through a hole in the integrated output flange 17. Generally it is possible that a common integrated output flange 17 for all lasers 10 is provided. In the depicted embodiment, however, there is one integrated output flange 17 per laser 10 and each integrated output flange 17 exhibits one beam delivery means 14 and one hole through which a respective laser beam can pass.

In the inner area 5, optical means 30, 40, 45, 50 for shaping and deflecting the laser beams are provided. This arrangement may lead to comparably low space requirements. Simultaneously, opposing resonator tubes 12 of one laser are separated by the inner area 5 which facilitates cooling of the tubes 12.

The laser beams coming from the beam delivery means 14 impinge on a set of beam shaping means 40 for refocusing the laser beams. The set of beam shaping means comprises one beam shaping means 40a-40i for each laser beam. Thus, the focuses of the laser beams can be set independently from each other. Depicted is one lens per beam shaping means 40a-40i. However, each beam shaping means may comprise at least two optical elements, e.g. mirrors or lenses, which form a telescopic means. Adjusting the focal lengths of the laser beams then may require only minor displacements of the optical elements of the telescopic means.

The laser beams then impinge on a set of deflection means 30. In the example shown, the laser beams previously travel through the beam shaping means 40. However, this order may be changed or the single elements of both sets may alternate, i.e. one element of the beam shaping means 40 may be arranged between two elements of the deflection means 30.

It is generally also possible that the beam delivery means 14 form part of the deflection means 30 or part of the telescopic means 40. The number of required optical elements is then advantageously reduced.

For illustrative reasons, the set of deflection means 30 is depicted with only one deflection means 33a-33i per laser beam. However, it may be preferred that at least two deflection means per laser beam are provided. All deflection means may be adjusted in their position independent from each other. Any desired 2D arrangement of laser beams can thus be achieved.

In general, the deflection means may be any means that change the propagation direction of a laser beam. In the shown example, the deflection means are mirrors which can also be referred to as mapping mirrors 33a-33i.

The mapping mirrors 33a-33i are tiltable and displaceable, that is translationally movable. For tilting the mirrors, each mapping mirror 33a-33i is gimbal mounted. A control unit (not depicted) may be adapted to set a desired position of each mapping mirror 33a-33i via the gimbals.

After leaving the deflection means 30, the laser beams impinge on a number of common optical elements, i.e. optical elements onto which all laser beams impinge. These may comprise a telescopic device 45 for global adjustment of the focuses of the laser beams. In contrast to the set of telescopic means 40 described above, the telescopic device 45 affects all laser beams equally.

The optical elements in the beam path may further comprise means for altering or homogenizing the intensity profile of a light beam, means for changing a polarisation of the light beams, in particular for achieving a common polarisation over the whole cross section of a light beam, or for depolarising the light beams.

Finally, the laser beams are directed out of the apparatus 100 by a scanning mirror device. This device may comprise two galvanometer scanners 50, each having a rotatable common mirror 50a onto which all laser beams impinge. With two galvanometer scanners 50, any direction of travel can be readily set for the laser beams.

Figure 2:
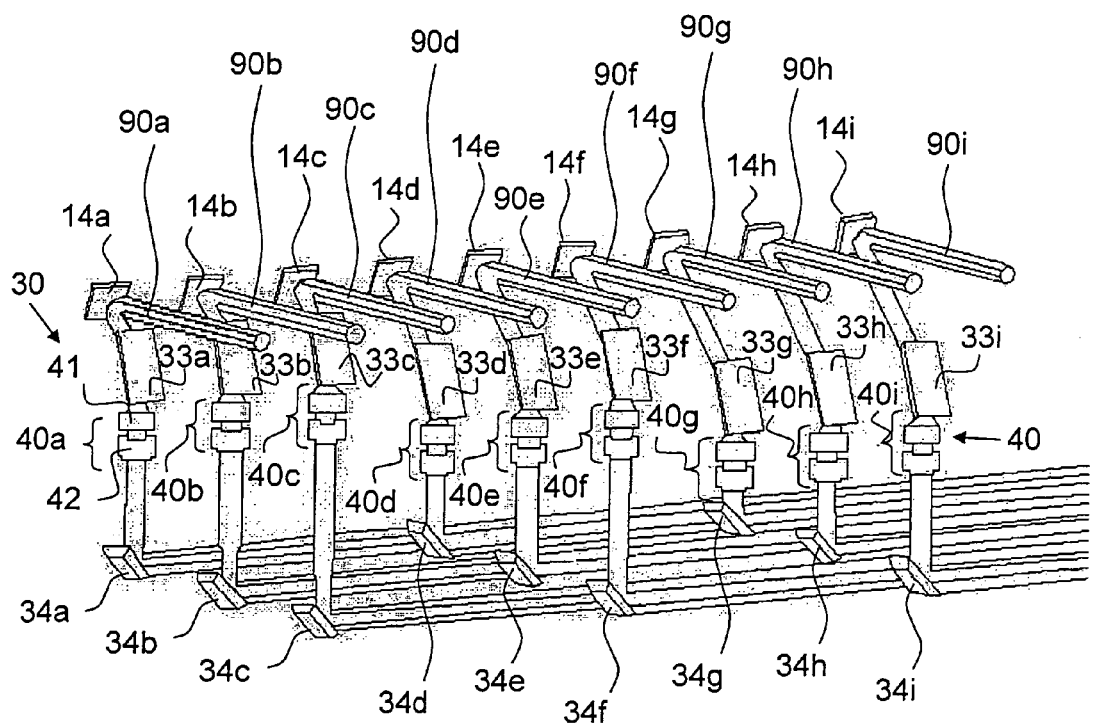
FIG. 2 shows a configuration of mapping mirrors of a set of deflection means for rearranging the laser beams into a two-dimensional array.

FIG. 2 depicts a configuration of the mapping mirrors for rearranging the laser beams 90a-90i into a two-dimensional array of laser beams, e.g. a three by three square. The set of deflection means 30 comprises a first set of mapping mirrors 33a-33i, onto which the laser beams 90a-90i impinge.

Also shown are the beam delivery means which redirect the light beams 90a-90i coming from the lasers to the first set of mapping mirrors 33. The beam delivery means are formed by a set of mirrors 14a-14i, i.e. one beam delivery means per laser beam. In other embodiments, this set may be substituted by one long mirror.

The laser beams 90a-90i are reflected from the first set of mapping mirrors 33a-33i and eventually impinge on a second set of mapping mirrors 34a-34i. The second set forms a two dimensional configuration. The laser beams are redirected by the second set to travel in a two dimensional arrangement.

For beam shaping and collimating the laser beams 90a-90i, a set of beam shaping means 40 is provided which comprises a plurality of beam shaping means 40a-40i, each having at least two lenses 41 and 42. For adjusting the focus of each laser beam 90a-90i and thus a spot size on an object to be marked, the lenses 41 and 42 can be offset in the propagating direction of the laser beams 90a-90i. The beam shaping means 40a-40i therefore constitute telescopic means 40a-40i. As there is one telescopic means 40a-40i for each laser beam 90a-90i, the beams can also be adjusted for path length differences. Another set of mapping mirrors may be provided; however, two sets of mapping mirrors are generally sufficient.

In the example shown, the telescopic means 40a-40i are arranged between the first and the second set of mapping mirrors. However, the telescopic means 40a-40i may instead be arranged prior to the first set or after the second set of mapping mirrors.

In the two dimensional arrangement, the distance between the laser beams 90a, 90i being most distant to one another is greatly reduced, especially in comparison to any linear arrangement of the laser beams. The beams are more tightly packed and therefore go through the central portion of optical elements, such as focusing optics 45. As optical aberrations occur mainly in the outer regions of optical elements, the two dimensional arrangement has the benefit of improved focusing and beam quality of the laser beams. Especially the outer most laser beams suffer less distortion compared to a linear arrangement of the laser beams. Furthermore, the size of optical elements can be reduced, leading to lower overall costs.

Reducing the beam separation also allows the design of the stack of gas lasers to be optimized for thermal cooling and RF excitation without penalizing the resolution or character size of the print, i.e., a larger separation of the gas lasers can be compensated.

A scanning motion of the laser beams 90a-90i for printing a sign on an object may be performed by tilting the mapping mirrors 34a-34i of the second set of mapping mirrors. Scanning devices such as galvanometer scanners with a common mirror for redirecting all laser beams 90a-90i are in this case not present. However, it may also be useful to provide such scanning devices.

Figure 3:
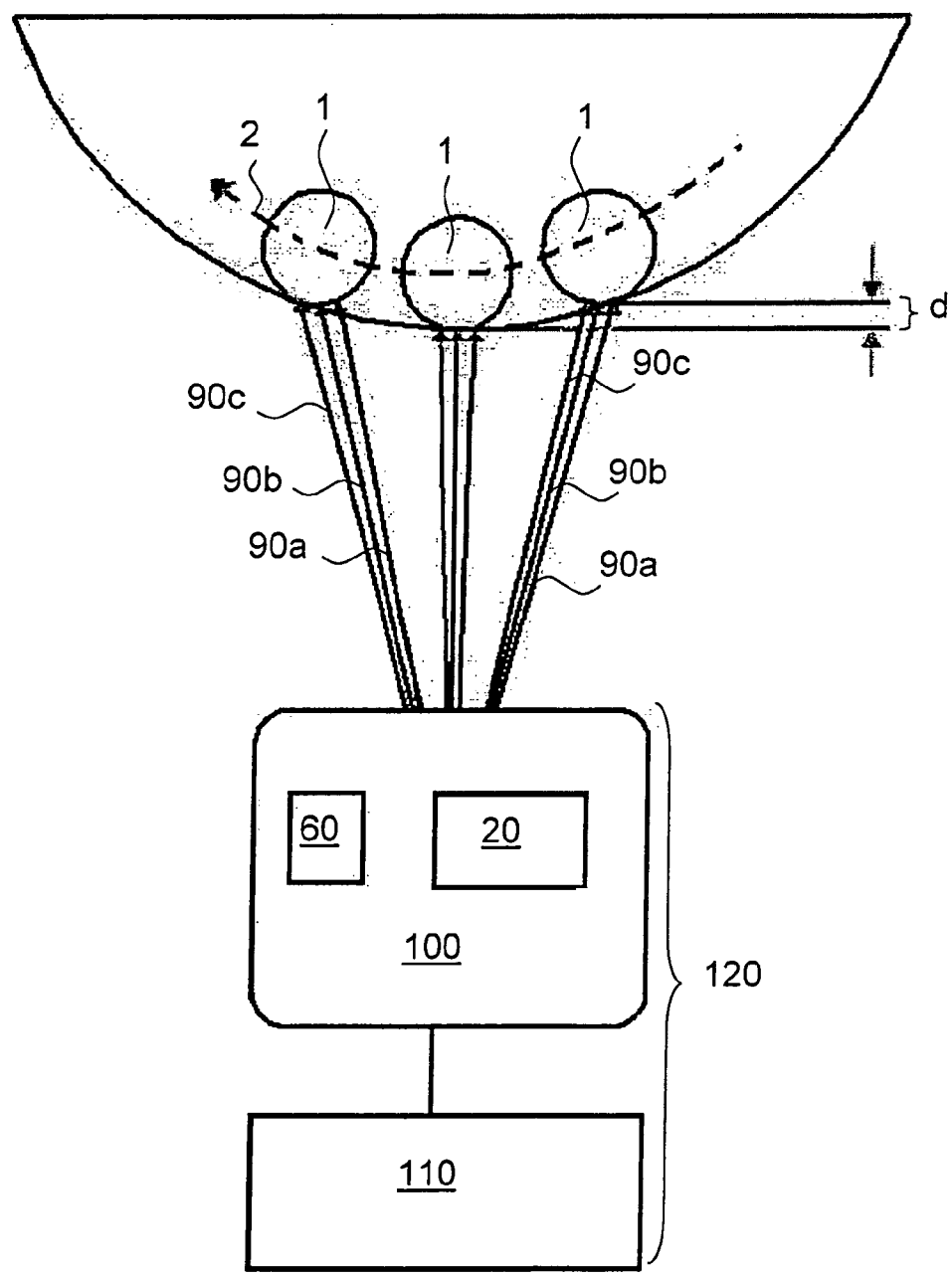
FIG. 3 shows an inventive marking system and an object to be marked moving relative to the marking system.

FIG. 3 shows schematically a marking system 120 and an object 1 to be marked.

The object 1 is moved in an object movement direction 2 and is depicted in three different positions, that is at three different points in time. The marking system 120 comprises a marking apparatus 100 and pivoting means 110 for tilting the marking apparatus 100.

The marking apparatus 100 may comprise any components as described above, e.g. deflection means constituted by two sets of mapping mirrors. As shown in FIG. 3, a control unit 20 is also provided as well as positioning means 60. The latter serves for positioning the sets of mapping mirrors. The individual mapping mirrors may be fixed within the respective array such that they cannot be displaced but tilted, e.g. with gimbal mounts.

The marking apparatus 100 emits a plurality of laser beams in a 2D arrangement, three of which 90a, 90b, 90c are shown in FIG. 3. As the object 1 moves, the laser beams 90a, 90b, 90c are correspondingly redirected.

Depending on the shape and the position of the object 1, the distance between the apparatus 100 and the object 1 may change by as much as indicated with the reference sign d. Furthermore, at one point in time, the distance may be different for each laser beam 90a, 90b, 90c. Still, the spot sizes of the laser beams 90a, 90b, 90c on the object 1 are to be equal. To this end, beam shaping means as described above are provided and adjusted by the control unit 20.

In the following, the function and benefit of the pivoting means 110 are explained.

When the object is moved relative to the marking apparatus, it is possible that the laser beams of two gas lasers hit the same area on the object in the object movement direction although the laser beams of these lasers are offset to one another in the object movement direction. To this end, the activation of one laser is delayed. This delay corresponds to the time needed for the object to travel a distance equal to the beam separation of said two laser beams, the beam separation being in this case determined in the object movement direction.

A line extending in a direction perpendicular to the object movement direction may be printed by angularly tilting the two dimensional arrangement of laser beams. The tilting may be carried out with the pivoting means 110. Together with a delay of the firing, the tilting allows for printing a line formed by dots. The dots may overlap or may be separated. The length of the line thus produced is determined by the tilt angle. The size of each dot and thus the width of the line can then be controlled with the beam shaping means.

The described marking apparatus allows for redirecting a plurality of laser beams to form a 2D pattern, in which the laser beams have advantageously a very small beam separation. Each laser beam can be individually adjusted by beam shaping means. Space requirements are minimized by arranging optical elements within an area surrounded by the lasers.

The invention claimed is:

1. A marking apparatus for marking an object with laser light, comprising:
 a plurality of lasers;
 a control unit for individually activating each of the plurality of lasers to emit a laser beam according to a sign to be marked; and
 a set of deflection means for rearranging the laser beams into a two-dimensional array of laser beams,
 wherein the set of deflection means comprises at least one deflection means per laser beam,
 wherein:
 each deflection means is at least one of: individually adjustable in its deflection direction or individually shiftable for setting any desired two-dimensional array of laser beams,
 the deflection means are individually adjustable by the control unit which is configured to at least one of: shift the deflection means or adjust the deflection directions of the deflection means, and
 the control unit is configured to delay the activation of each laser individually such that, in the case of an object moving relative to the marking apparatus in an object movement direction, at least two laser beams impinge on the object at the same position in the object movement direction.

2. The marking apparatus according to claim 1, wherein the at least one deflection means per laser beam is at least one mapping mirror or one optical waveguide per laser beam.

3. The marking apparatus according to claim 1, wherein a length of the two-dimensional array of laser beams is shorter than a length of an array formed by the laser beams prior to impinging on the set of deflection means.

4. The marking apparatus according to claim 1, wherein:
 the set of deflection means comprises a first and a second set of mapping mirrors,
 each set of mapping mirrors comprises at least one mapping mirror per laser beam,
 the first set of mapping mirrors directs the laser beams onto the second set of mapping mirrors, and
 the second set of mapping mirrors is arranged in a two-dimensional configuration for redirecting the laser beams in the two-dimensional array.

5. The marking apparatus according to claim 1, wherein:
 at least one scanning mirror device is provided which comprises a common mirror onto which all laser beams coming from the set of deflection means impinge, and
 the control unit is configured to pivot the scanning mirror device.

6. The marking apparatus according to claim 1, wherein for marking the object while it is moving relative to the marking apparatus, the control unit is configured to adjust at least one of: the deflection means or the at least one scanning mirror device, according to information on a movement of the object.

7. The marking apparatus according to claim 1, wherein the control unit is configured to control the deflection means to set a degree of convergence or divergence of the laser beams emanating from the deflection means.

8. The marking apparatus according to claim 1, wherein a telescopic device with at least two lenses is provided for global adjustment of the focal lengths of the laser beams.

9. The marking apparatus according claim 8, wherein the control unit is configured to set the telescopic device such that the focal lengths of the laser beams correspond to a distance to the object to be marked.

10. The marking apparatus according to claim 1, wherein:
 each deflection means comprises an optical waveguide,
 each optical waveguide comprises a first end portion for receiving one of the laser beams and a second end portion for emitting the respective laser beam, and
 the second end portions of the optical waveguides are arranged in a two-dimensional configuration.

11. The marking apparatus according to claim 10, wherein the optical waveguides have the same length.

12. The marking apparatus according to claim 1, wherein the control unit is further adapted to adjust the set of deflection means such that the laser beams of at least two lasers are directed onto a common spot.

13. The marking apparatus according to claim 1, wherein a set of beam shaping means is provided and adapted for at least one of: individually shaping each laser beam, or setting a degree of convergence or divergence of each laser beam.

14. A marking system comprising:
   the marking apparatus according to claim 1, and
   pivoting means for tilting the marking apparatus relative to an object movement direction of the object to be marked.

\* \* \* \* \*